(12) United States Patent
Eriksson et al.

(10) Patent No.: US 10,361,605 B2
(45) Date of Patent: Jul. 23, 2019

(54) METHOD OF AND A DEVICE FOR PROTECTING A MOTOR IN A POD AGAINST SHAFT BENDING SHOCKS

(75) Inventors: Andreas Eriksson, Hammaro (SE); Anders Lobell, Karlskoga (SE); Per Nahnfeldt, Karlstad (SE); Gunnar Styrud, Kristinehamn (SE)

(73) Assignee: Rolls-Royce Akteibolag (SE)

( * ) Notice: Subject to any disclaimer, the term of this patent is extended or adjusted under 35 U.S.C. 154(b) by 960 days.

(21) Appl. No.: 14/344,524

(22) PCT Filed: Sep. 10, 2012

(86) PCT No.: PCT/SE2012/050951
§ 371 (c)(1),
(2), (4) Date: Nov. 12, 2014

(87) PCT Pub. No.: WO2013/039443
PCT Pub. Date: Mar. 21, 2013

(65) Prior Publication Data
US 2015/0054367 A1    Feb. 26, 2015

(30) Foreign Application Priority Data

Sep. 13, 2011 (SE) ...................................... 1150824

(51) Int. Cl.
*H02K 7/08*     (2006.01)
*B23P 15/00*    (2006.01)
(Continued)

(52) U.S. Cl.
CPC ............ *H02K 7/083* (2013.01); *B23P 15/003* (2013.01); *B63H 23/321* (2013.01); *F16C 17/14* (2013.01);
(Continued)

(58) Field of Classification Search
CPC ........ B63H 23/321; F16C 17/14; F16C 17/20; F16C 32/0442; F16C 39/02; F16C 41/004;
(Continued)

(56) References Cited

U.S. PATENT DOCUMENTS 3,191,079 A * 6/1965 Gitzendanner ........ H02K 5/167
310/214
5,355,040 A * 10/1994 New .................... F16C 32/0402
310/90

(Continued)

FOREIGN PATENT DOCUMENTS

EP    2194285 A1 * 6/2010 .............. F16C 39/02
JP    58112894 A      7/1983
(Continued)

OTHER PUBLICATIONS

Kito, Machine Translation of JP11182547, Jul. 1999.*
(Continued)

*Primary Examiner* — Quyen P Leung
*Assistant Examiner* — Eric Johnson
(74) *Attorney, Agent, or Firm* — Eric L. Sophir; Dentons US LLP

(57) ABSTRACT

A method and a device for protecting an electric motor in a pod unit for propulsion of marine vessels against shaft bending shocks when the blades of the pod propeller hit ice blocks or other hard objects, said motor having a drive shaft, a rotor and a stator, said shocks tending to momentarily bend the drive shaft (3) to such an extent that the rotor (41) will come into contact with the stator. The rotor is prevented from coming in detrimental contact with the stator by providing at least two members, which together form a radial plain bearing having mating arcuate bearing surfaces, which during normal operation of the motor are spaced from (Continued)

one another by a gap and come in contact with one another only at extreme loads with short durations.

17 Claims, 2 Drawing Sheets

(51) Int. Cl.
*F16C 32/06* (2006.01)
*F16C 41/00* (2006.01)
*H02K 7/09* (2006.01)
*F16C 39/02* (2006.01)
*F16C 17/14* (2006.01)
*F16C 17/20* (2006.01)
*B63H 23/32* (2006.01)
*H02K 7/102* (2006.01)
*H02K 13/02* (2006.01)
*H02K 17/22* (2006.01)
*B63B 43/18* (2006.01)
*B63H 5/125* (2006.01)

(52) U.S. Cl.
CPC .......... *F16C 17/20* (2013.01); *F16C 32/0607* (2013.01); *F16C 39/02* (2013.01); *F16C 41/004* (2013.01); *H02K 7/09* (2013.01); *B63B 43/18* (2013.01); *B63B 2211/06* (2013.01); *B63H 2005/1258* (2013.01); *B63H 2023/322* (2013.01); *F16C 2326/30* (2013.01); *H02K 7/102* (2013.01); *H02K 13/02* (2013.01); *H02K 17/22* (2013.01); *Y10T 29/49696* (2015.01)

(58) Field of Classification Search
CPC ...... F16C 32/0607; H02K 7/08; H02K 7/083; H02K 7/085; H02K 7/088; H02K 7/09; B23P 15/003
USPC ........................................ 440/6, 83
See application file for complete search history.

(56) References Cited

U.S. PATENT DOCUMENTS

| | | | | |
|---|---|---|---|---|
| 5,798,588 | A | 8/1998 | Okuyama et al. | |
| 8,786,151 | B1* | 7/2014 | Cole | H02K 7/102 310/90 |
| 2003/0194922 | A1* | 10/2003 | Van Dine | B63H 23/24 440/6 |
| 2004/0053545 | A1* | 3/2004 | Le Flem | B63H 5/125 440/88 C |
| 2004/0222706 | A1* | 11/2004 | Ickinger | B29C 45/5008 310/83 |
| 2005/0009418 | A1* | 1/2005 | Ries | B63H 5/125 440/6 |
| 2005/0035673 | A1* | 2/2005 | Lafontaine | H02K 1/187 310/58 |
| 2007/0281558 | A1* | 12/2007 | Jansen | F03D 9/00 440/6 |
| 2009/0243301 | A1* | 10/2009 | Longtin | F03D 7/02 290/55 |
| 2009/0251013 | A1* | 10/2009 | Vollmer | H02K 16/00 310/12.14 |
| 2009/0256442 | A1* | 10/2009 | Stiesdal | F03D 9/002 310/90 |
| 2010/0045047 | A1* | 2/2010 | Stiesdal | F03D 1/001 290/55 |
| 2013/0069462 | A1* | 3/2013 | Calvert | B60K 7/0007 310/88 |
| 2013/0214540 | A1* | 8/2013 | Gelmini | F03D 11/00 290/55 |

FOREIGN PATENT DOCUMENTS

| | | | | |
|---|---|---|---|---|
| JP | 8196054 | A | 7/1996 | |
| JP | 11182547 | A * | 7/1999 | .............. F16C 39/02 |
| JP | 2000134864 | A | 5/2000 | |
| JP | 2002139037 | A * | 5/2002 | .......... F16C 32/0442 |
| WO | WO 9525376 | A1 * | 9/1995 | ............ F16C 17/024 |
| WO | 2010/108544 | A2 | 9/2010 | |

OTHER PUBLICATIONS

Bassham, "An Evaluation of Electric Motors for Ship Propulsion", Jun. 2003.*
Carlton, "Podded Propulsors: Some Results of Recent Research and Full Scal Experience", Journal of Marine Engineering & Technology, 7:1, pp. 1-14, 2008.*
Fujimoto, Machine Translation of JP2002139037, May 2002.*
Extended European Search Report dated Dec. 9, 2015 corresponding to European Patent Application No. 12831803.7, 12 pages.
De Swardt, H., "The Effects of an Increased Air Gap of an Electric Motor," Vector, Oct. 2007, Retrieved form the Internet: URL:http://www.mandc.co.za/pdfs/Air_Gap.pdf [retrieved on Dec. 1, 2015], 10 pages.
Gieras, J.F., "Permanent Magnet Motor Technology: Design and Applications," CRC Press, Jan. 2010, pp. 552-559.
Ehehalt, U., et al., "Instability of Unbalance Excited Synchronous Forward Whirl at Rotor-Stator-Contract," PAMM—Proc. Appl. Math. Mech. 2, 2003, pp. 60-61.
European Communication dated May 18, 2016 in European Application No. 12 831 803.7, 6 pages.
Pod Propulsion, MarineLink.com, https://web.archive.org/web/20110816005754/http://www.marinelink.com/article/pod-propulsion, Aug. 16, 2011, 4 pages.
JP 2000134864 published May 12, 2000, machine-generated English-language translation downloaded from www.jpo.go.jp, 6 pages.
JP 8196054 published Jul. 30, 1996, machine-generated English-language abstract translation downloaded from www.jpo.go.jp, 2 pages.
JP 58112894 published Jul. 5, 1983, machine-generated English-translation abstract from EPODOC/EPO.
International Search Report from PCT/SE2012/050951, dated Nov. 16, 2012.
Canadian Office Action dated May 2, 2018, issued in corresponding Canadian Application No. 2,847,390, 5 pages.

* cited by examiner

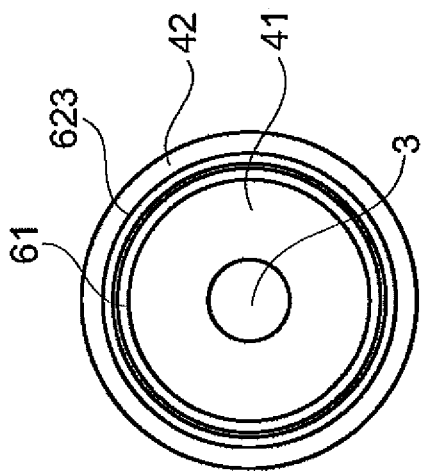
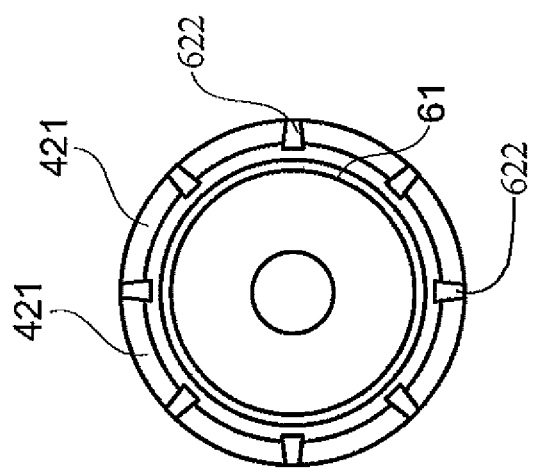
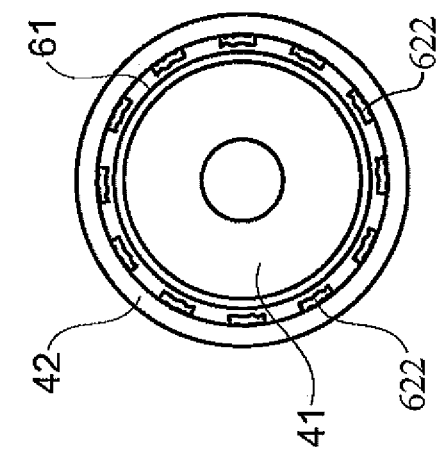
Fig. 2c
Fig. 2a
Fig. 2b

METHOD OF AND A DEVICE FOR PROTECTING A MOTOR IN A POD AGAINST SHAFT BENDING SHOCKS

CROSS-REFERENCE TO RELATED APPLICATIONS

This application claims priority to PCT/SE2012/050951, filed Sep. 10, 2012, entitled "A METHOD OF AND A DEVICE FOR PROTECTING A MOTOR IN A POD AGAINST SHAFT BENDING SHOCKS," which claims priority to Swedish Patent Application No. 1150824-9, filed Sep. 13, 2011, entitled "A METHOD OF AND A DEVICE FOR PROTECTING A MOTOR IN A POD AGAINST SHAFT BENDING SHOCKS," all of which are incorporated by reference in their entirety.

TECHNICAL FIELD

The present invention relates to a method of and a device for protecting an electric motor in a pod unit for propulsion of marine vessels against shaft bending shocks when the blades of the pod propeller hit ice blocks or other hard objects, said motor having a drive shaft, a rotor and a stator, said shocks tending to momentarily bend the drive shaft to such an extent that the rotor will come into contact with the stator.

BACKGROUND ART

When operating pod units in arctic seas, very stiff propeller blades are required. This means that also a very stiff shaft is required in order to avoid that the motor inside the pod is damaged in case the propeller hits ice or some other hard object, e.g. is grounded, whereby the shaft will be exposed to a bending force.

Another situation that could cause high bending forces (and risk of damaging the motor) would be when high shock loads are encountered, e.g. due to an explosion of a mine. As a consequence this might be required as a dimensioning criterion for certain projects, e.g. for navy vessels.

To avoid a detrimental bending of the shaft, it would be obvious to use a very stiff shaft. However, this means that that shaft would have to have a very large diameter, which is costly, increases the weight of the pod unit and further requires space that not always is available.

WO 2010/108544 A2 discloses a bearing assembly for an electrical motor, comprising a shaft, a housing, and a main bearing between the shaft and the housing, wherein the shaft is surrounded by a rigid sleeve for functioning as an auxiliary bearing in case of a breakdown of the main bearing and as a grease sealing under normal operation. The clearance between the sleeve and the shaft is smaller than the air-gap between the stator and the rotor of the motor. The clearance is at most 0.6 mm but may be at most 0.3, 0.2, 0.1 or 0.05 mm, while the air-gap between the stator and the rotor typically is 1.2-1.5 mm. With reference to the interior of the pod housing, the sleeve is shown positioned just inside the main bearing. There is no indication that such an arrangement would make it possible to reduce the required diameter of the shaft, i.e. to use a weaker shaft than else would be possible.

SUMMARY OF THE INVENTION

The object of the present invention is to protect the motor without having to over-dimension the shaft.

In accordance with the present invention, this object is achieved in that at least two members are provided, which together form a radial plain bearing having mating arcuate bearing surfaces, which during normal operation of the motor are spaced from one another by a gap and come in contact with one another only at extreme loads with short durations, one of the members being an inner member having a circular circumference constituting one of the bearing surfaces, said inner member having its arcuate bearing surface coaxial with the rotor and rotary therewith, and at least one of the other members being an outer member, which fixed in relation to the stator and has its arcuate bearing surface coaxial therewith.

When the blades of the pod propeller hit ice blocks or other hard objects, and the arising extreme loads with short durations bend of the drive shaft to such an extent that the rotor will tend to come into detrimental contact with the stator, the detrimental contact is prevented in that the inner member of the radial bearing will bear against the outer member(s). Similarly, if a chock load hits the POD the invention may safeguard functioning of the motor by eliminating detrimental contact between stator and rotor.

Suitably, one of the at least two members consists of a softer material than the other. Furthermore it is mostly preferred to design the members of the invention to not allow electrical conduction, e.g. by using non-conductive material in at least one of the members. Most preferred the softer material is non-conductive to electricity. Thereby, when the bearing surfaces are in contact with each other, no conductive material will come loose and be spread inside the pod where it might harm the motor or other components.

The softer material preferably is used for the outer member(s). Then, the stator includes windings, and segments of the softer material are fitted between or on top of the windings of the stator. Alternatively, the softer material is fitted as a band on the inner surface of the stator.

As another alternative, the stator is fixed in a pod housing and the member of softer material is fixed to the housing.

When one of the at least two members consists of a softer material, the other of the at least two members consists of a harder material. Suitably, the harder material is used for the inner member, and the inner member is a ring.

Preferably, the rotor includes windings, and the ring of the harder material is either provided on top of the windings of the rotor or is an integrated part of the rotor or a non-integrated part at the end of the rotor.

Alternatively, the ring of the harder material is a dedicated device on the shaft line, such as a brake disc, or a member of the shaft itself, e.g. a flange.

BRIEF DESCRIPTION OF THE DRAWINGS

In the following, the invention will be described in more detail with reference to preferred embodiments and the appended drawings.

FIGS. 2a to 2c are schematic cross-sectional views of three different embodiments of a motor in the pod unit of FIG. 1.

MODE(S) FOR CARRYING OUT THE INVENTION

Figure 1:
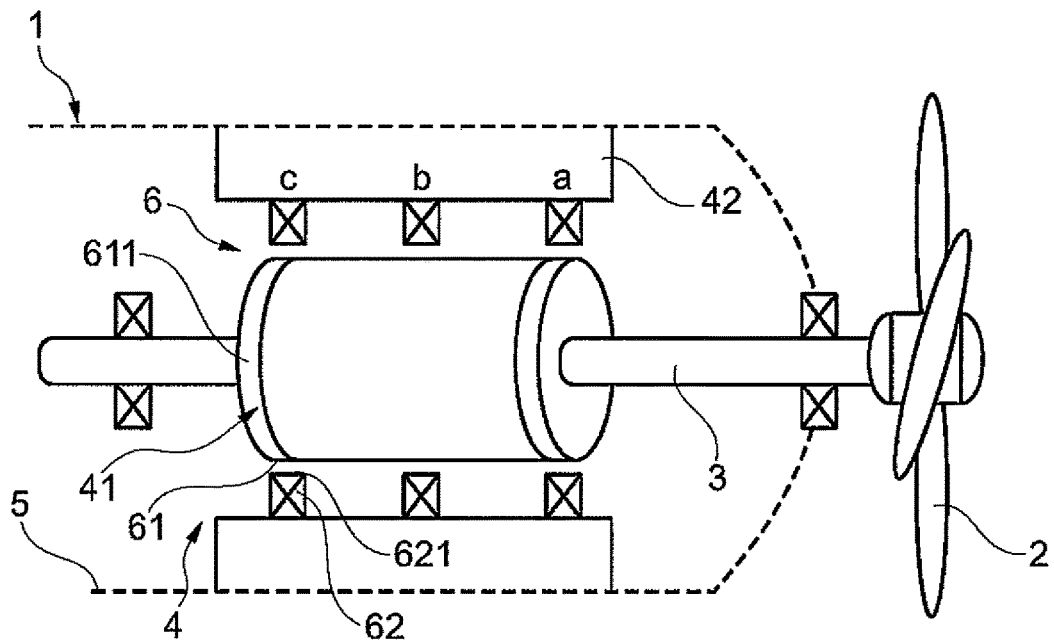
FIG. 1 is a sketchy partial cross-sectional view of a portion of a pod unit in accordance with a first embodiment of the present invention.

FIG. 1 shows a portion of a pod unit 1 for propulsion of a marine vessel in arctic seas, where the propeller blades 2 of the pod unit may hit ice or other hard objects or be grounded. In addition to the propeller, the pod unit 1 comprises a stiff drive shaft 3 connecting an electric motor 4 to the propeller. The motor 4 is placed inside a housing 5 and comprises a rotor 41 and a schematically shown stator 42. The rotor 41 and the shaft 3 form an assembly that is carried in bearings. When the propeller blades 2 hit ice or some other hard object, a high shock load is encountered, which tends to momentarily bend the rotor shaft assembly, so that the rotor 41 may come into contact with the stator 42 and damage the motor 4 unless prevented from doing so.

In accordance with the present invention, the rotor 41 is prevented from coming in detrimental contact with the stator 42 by providing at least two members 61, 62, which together form a radial plain bearing 6 having mating arcuate bearing surfaces 611 and 621, respectively, which during normal operation of the motor 4 are spaced from one another by a non-conductive gap, e.g. a gas gap, preferably an air gap, and come in contact with one another only at extreme loads with short durations. One of the members 61, 62 is an inner member 61 having a circular circumference that constitutes one 611 of the bearing surfaces 611, 621. The arcuate bearing surface 611 of the inner member 61 is coaxial with the rotor 41 and rotary therewith, and at least one of the other members is an outer member 62, which is fixed in relation to the stator 42 and has its arcuate bearing surface 621 coaxial therewith.

When the propeller blades 2 hit ice blocks or other hard objects, and the arising extreme loads with short durations bend the rotor shaft assembly to such an extent that the rotor 41 will tend to come into detrimental contact with the stator 42, the detrimental contact is prevented in that the inner member 61 of the radial plain bearing 6 will bear against the outer member(s) 62.

The radial plain bearing 6 may be located at any axial location along the shaft rotor assembly (between positions a and c in FIG. 1), but for maintenance purposes it is best to locate it at an end of the motor 4. Usually, it is preferred to locate it at the end closest to the propeller (at position a in FIG. 1), where also the bending of the shaft will be at a maximum. In case the loading condition is not bending but shock loads, it may be preferable to provide two radial plain bearings located at positions a and c in FIG. 1.

Suitably, one of the at least two members 61, 62 consists of a softer material than the other, and the softer material is non-conductive to electricity. Thereby, when the bearing surfaces 611 and 621 are in contact with each other, no conductive material will come loose from the softer bearing surface and be spread inside the pod 1 where it might harm the motor 4 or other components.

The softer material preferably is used for the outer member(s) 62. The stator 42 includes windings 421, and segments 622 of the softer material are fitted between the windings 421 of the stator 42 as shown in FIG. 2a or on top of the windings 421 of the stator 42 as shown in FIG. 2b. Alternatively, the softer material is fitted as a circumferential band 623 on the inner surface of the stator 42 as shown in FIG. 2c. Then, the radial plain bearing 6 is formed by two complete rings 61 and 623 instead of one ring 61 and a plurality of ring segments 62.

As another alternative, not shown, the member 62 of softer material is fixed to the pod housing 5.

It is easily realized that when one 62 of the at least two members 61, 62 consists of a softer material, the other one 61 of the at least two members 61, 62 consists of a harder material. Suitably, the harder material is used for the inner member 61, and the inner member is a ring 61.

Preferably, the rotor 41 includes windings 411, and the ring 61 of the harder material is either provided on top of the windings 411 of the rotor 41 or is an integrated part of the rotor 41, or a ring (or two, or more) at an end of the rotor.

Figure 3:
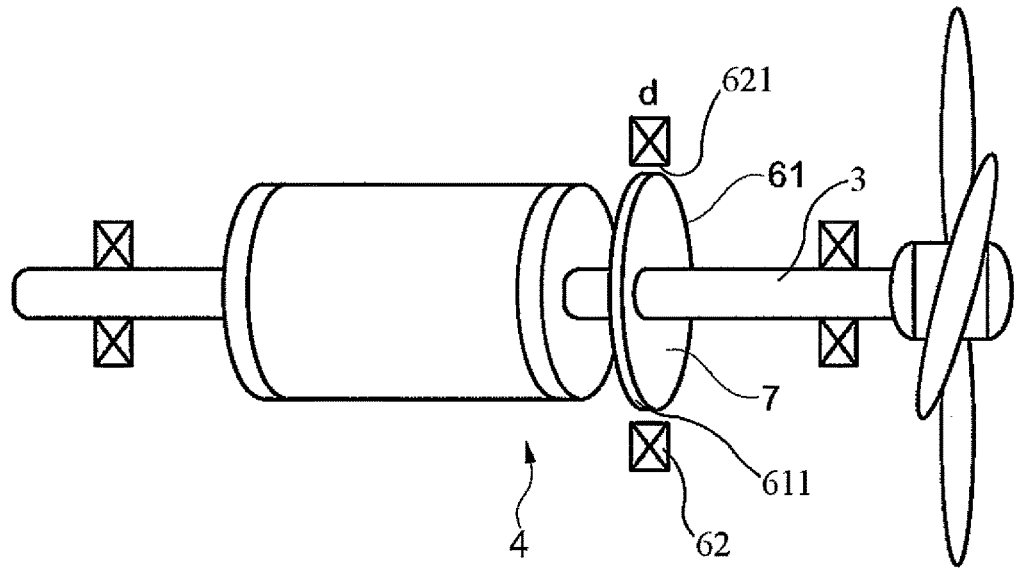
FIG. 3 is a sketchy partial cross-sectional view of a portion of a pod unit in accordance with another embodiment of the present invention.

Alternatively, the ring 61 of the harder material is a dedicated device of the motor 4 or the shaft 3 fitted there for another main purpose, such as a brake disc, as is shown in FIG. 3. The ring 61 may be a solid disc or a ring attached to the shaft 3, by means of spokes or the like. The outer member 62 may be fixedly attached to a fixed part of the motor 4, e.g. forming the inner surface of a part of a housing (not shown), or fixed to the POD-housing (directly or indirectly, not shown).

The ring 61 may also be arranged on the periphery of a flange coupling (not shown) of the shaft 3. If desired, it is possible to let the ring 61 and the ring segments 62 changes places, so that the ring segments 62 are provided on the rotor 41 and the ring 61 is provided on the stator 42. It is also possible, if desired, to use the harder material for the bearing member(s) provided on the stator 42 and the softer material for the bearing member(s) provided on the rotor 41.

The above detailed description is primarily intended only to facilitate the understanding of the invention, and any unnecessary limitations shall not be interpreted therefrom. Modifications, which during a study of the description become obvious to a person skilled in the art, may be made without any deviations from the inventive idea or the scope of the appended claims, e.g. it is evident that also bearing members of the same material/hardness may be used. Similarly it is evident that also conductive members may be used to fulfill the basic function of the invention.

INDUSTRIAL APPLICABILITY

The present invention is applicable for preventing detrimental contact between rotor and stator in a pod motor for a marine vessel for use in arctic seas, where the pod propeller may hit ice blocks or other hard object, thereby creating shocks that will tend to momentarily bend the pod shaft.

The invention claimed is:

1. A method of protecting an electric motor in a pod unit for propulsion of marine vessels against shaft bending shocks, said method comprising:
    fitting to the electric motor at least two members, which together form a radial plain bearing having mating arcuate bearing surfaces, wherein said motor has a drive shaft with first and second shaft bearings, and a rotor and a stator located between the first and second shaft bearings, wherein during normal operation of the motor the at least two members are spaced from one another by an air gap, and wherein extreme shaft bending shocks tend to momentarily bend the drive shaft to such an extent that the at least two members come in contact with one another only at extreme shock loads with short duration, wherein the contact between the at least two members prevents the stator from contacting the rotor;
    wherein at least one of the at least two members is an inner member having a circular circumference constituting one of the arcuate bearing surfaces, the inner member having its arcuate bearing surface coaxial with the rotor and rotary therewith, and at least one other of the members is an outer member, which is fixed in relation to the stator and also has its arcuate bearing surface coaxial with the rotor, and wherein the inner member is formed of a first material and the outer member is formed of a second material, wherein the first material has greater hardness than the second material.

2. The method according to claim 1, wherein the outer member comprises a plurality of segments formed of the second material.

3. The method according to claim 1, wherein the second material is fitted as a circumferential band on an inner surface of the stator.

4. The method according to claim 1, wherein the inner member is a ring.

5. The method according to claim 4, wherein the ring is arranged on a dedicated device of the motor.

6. The method according to claim 5, wherein the dedicated device of the motor is a brake disc.

7. A device for protecting an electric motor in a pod unit for propulsion of marine vessels against shaft bending shocks, the device comprising:
   at least two members, which together form a radial plain bearing having mating arcuate bearing surfaces,
   wherein said motor has a drive shaft with first and second shaft bearings, and a rotor and a stator located between the first and second shaft bearings, wherein the electric motor and the at least two members are configured such that during normal operation of the motor, the at least two members are spaced from one another by a gas gap, and when subjected to extreme shaft bending shocks the drive shaft tends to momentarily bend to such an extent that the at least two members come in contact with one another only at extreme shock loads with short duration, wherein the contact between the at least two members prevents the stator from contacting the rotor; and
   wherein at least one of the at least two members is an inner member having a circular circumference constituting one of the arcuate bearing surfaces, the inner member having its arcuate bearing surface coaxial with the rotor and rotary therewith, and at least one other of the at least two members is an outer member, which is fixed in relation to the stator and also has its arcuate bearing surface coaxial with the rotor,
   wherein the at least two members are located at an axial location at an end of the electric motor closest to a propeller of the pod unit.

8. The device according to claim 7, wherein the inner member is formed of a first material and the outer member is formed of a second material, wherein the first material has greater hardness than the second material, and wherein the second material is non-conductive to electricity.

9. The device according to claim 8, wherein the outer member comprises a plurality of segments formed of the second material.

10. The device according to claim 8, wherein the second material is fitted as a circumferential band on an inner surface of the stator.

11. The device according to claim 8, wherein the inner member is a ring.

12. The device according to claim 11, wherein the ring is arranged on a dedicated device of the motor.

13. The device according to claim 12, wherein the dedicated device of the motor is a brake disc.

14. A pod unit for propulsion of marine vessels, the pod unit comprising:
   an electric motor, comprising
      a rotor;
      a stator;
      a drive shaft; and
   two first members, which together form a first radial plain bearing having mating arcuate bearing surfaces;
   two second members, which together form a second radial plain bearing having mating arcuate bearing surfaces;
   wherein the electric motor, the two first members, and the two second members are configured such that during normal operation of the motor, the two first members are spaced from one another by a first gas gap, the two second members are spaced from one another by a second gas gap, and when subjected to extreme shaft bending shocks the drive shaft tends to momentarily bend to such an extent that the two first members come in contact with one another and the two second members come into contact with each other only at extreme shock loads with short duration, wherein the contact between the two first members and the contact between the two second members prevents the stator from contacting the rotor;
   wherein one of the two first members is an inner first member having a circular circumference constituting one of the arcuate bearing surfaces, the inner first member having its arcuate bearing surface coaxial with the rotor and rotary therewith, and the other of the two first members is an outer first member, which is fixed in relation to the stator and also has its arcuate bearing surface coaxial with the rotor; wherein the inner first member is formed of a first material and the outer first member is formed of a second material, wherein the first material has greater hardness than the second material, and wherein the second material is non-conductive to electricity; and
   wherein one of the two second members is an inner second member having a circular circumference constituting one of the arcuate bearing surfaces, the inner second member having its arcuate bearing surface coaxial with the rotor and rotary therewith, and the other of the two second members is an outer second member, which is fixed in relation to the stator and also has its arcuate bearing surface coaxial with the rotor; wherein the inner second member is formed of a first material and the outer second member is formed of a second material, wherein the first material has greater hardness than the second material, and wherein the second material is non-conductive to electricity; and
   wherein the two first members are located at an axial location at an end of the electric motor closest to a propeller of the pod unit; and
   wherein the two second members are located at an axial location at an end of the electric motor farthest from a propeller of the pod unit.

15. A pod unit according to claim 14, wherein each of the outer first member and the outer second member comprises a plurality of segments formed of the second material.

16. A pod unit according to claim 14, wherein each of the inner first member and the inner second member is a ring.

17. A pod unit according to claim 16, wherein each ring is arranged on a dedicated device of the electric motor.

* * * * *